(12) United States Patent
Siebert et al.

(10) Patent No.: US 6,311,569 B1
(45) Date of Patent: Nov. 6, 2001

(54) FLOWMETER HAVING AN IMPELLER WITH A CARRIER BODY HAVING A RADIAL OPENING TO A CENTRAL BORING

(75) Inventors: Christian Siebert, Kassel; Frank Trinter, Kaufungen, both of (DE)

(73) Assignee: Siebert & Kühn GmbH & Co. KG, Kaufungen/Kassel (DE)

( * ) Notice: Subject to any disclaimer, the term of this patent is extended or adjusted under 35 U.S.C. 154(b) by 0 days.

(21) Appl. No.: 09/207,131

(22) Filed: Dec. 8, 1998

Related U.S. Application Data

(63) Continuation-in-part of application No. PCT/DE98/00706, filed on Mar. 10, 1998.

(30) Foreign Application Priority Data

May 23, 1997 (DE) .................................... PCT/DE97/01063

(51) Int. Cl.⁷ ....................................................... G01F 1/05
(52) U.S. Cl. ..................................... 73/861.79; 73/861.91
(58) Field of Search ............................ 73/861.75, 861.77, 73/861.78, 861.79, 861.83, 861.91, 861.92, 861.89; 29/889

(56) References Cited

U.S. PATENT DOCUMENTS

| | | | |
|---|---|---|---|
| 3,636,767 | * 1/1972 | Duffy | 73/229 |
| 3,811,323 | * 5/1974 | Swenson | 73/231 |
| 4,242,916 | * 1/1981 | Amemori et al. | 73/861.83 |
| 4,327,592 | * 5/1982 | Fincke | 73/861.91 |
| 4,715,234 | * 12/1987 | Allen et al. | 73/861.91 |
| 4,852,401 | * 8/1989 | Hrametz et al. | 73/155 |
| 4,856,348 | * 8/1989 | Hall | 73/861.78 |
| 5,372,048 | 12/1994 | Dunbar . | |
| 5,450,760 | * 9/1995 | Lew et al. | 73/861.77 |

FOREIGN PATENT DOCUMENTS

| | | |
|---|---|---|
| 308922 | 8/1955 | (CH) . |
| 3415366 | 11/1985 | (DE) . |
| 2519766 | 7/1983 | (FR) . |
| WO9221939 | 12/1992 | (WO) . |

OTHER PUBLICATIONS

Patent Abstracts of Japan 57 020611 Feb. 3, 1982 Yamatake Honeywell Co.
Patent Abstracts of Japan 56 128414 Okt. 07, 1981 Kitano Akitoshi.

* cited by examiner

Primary Examiner—Benjamin R. Fuller
Assistant Examiner—Corey D. Mack
(74) Attorney, Agent, or Firm—Thomas R. Vigil

(57) ABSTRACT

The device is used to determine the flow rate of a medium, e.g. of a fluid or a gas, including a housing (1) with a chamber (2) through which the medium is axially flowing and which receives an impeller wheel (10) with one blade (13), whereas the impeller wheel (10) is provided with a carrier body (12) having a centrical boring (15) for receiving an axle (11), whereas the carrier body (12) is provided in the area of the axle (11) with at least one opening (12a) running radially to the centrical boring in the carrier body (12), whereas the axle (11) is arranged in the carrier body (12) by at least one, preferably two radial bearings (17, 18), whereas a radial allowance is provided between the boring of the carrier body (12) and the axle (11), whereas, due to the radial allowance between boring (15) in the carrier body (12) and axle (11), water is entering at the open side of the boring (15) and is exiting through the radially running opening (12a) in the carrier body (12).

14 Claims, 2 Drawing Sheets

FLOWMETER HAVING AN IMPELLER WITH A CARRIER BODY HAVING A RADIAL OPENING TO A CENTRAL BORING

This application is a Continuation-In-Part Application of PCT Application No. PCT/DE 98/00706 filed on Mar. 10, 1998.

BACKGROUND OF THE INVENTION

1. Field of the Invention

The present invention concerns a device used to determine the flow rate of a medium, e.g. of a fluid or a gas, including a housing with a chamber through which the medium is flowing axially and which receives an impeller wheel with at least one blade, whereas the impeller wheel is provided with a carrier body having a centrical boring for receiving an axle, whereas the carrier body is provided in the area of the axle with at least one opening running radially to the centrical boring in the carrier body.

2. Description of the Prior Art

DE 41 11 001 discloses a device with a housing provided with an impeller wheel in a boring thereof which is brought to rotate. To induce the rotation of the impeller wheel, a so-called "spin body" is accomodated in front of the impeller wheel. This spin body occasions a spin within the flow, which in its turn brings the impeller wheel to rotate. To determine the rotation velocity, the blade ends are provided with magnets, whereas via said magnets a tension is induced in a spool accomodated in the housing. The rotation velocity of the blades can be determined by counting the tension pulses in the spool which are occasioned by the magnetic blades of the impeller wheel. This rotation velocity serves as a measure for the flow rate.

FR-A 2 717 536 discloses a device used to determine the revolutions/min. of a turbine, a perforated disk being accomodated in front of the turbine to equalize the incoming flow.

CH-PS 308922 discloses a flowmeter with a rotor, as it is used for measuring the volume of fluids. The rotor includes a carrier body with a pulse-inducing element designed as a magnet and cooperating with a corresponding spool in the housing of the flowmeter. Blades are moreover accomodated on the rear end of the carrier body, whereas the carrier body is located in the housing so as to be axially movable.

The device described in U.S. Pat. No. 5,372,048 shows a housing with an impeller wheel, whereas the impeller wheel is borne by an axle. Here too, the impeller wheel can be received by the axle so as to be axially movable. The impeller wheel itself has on its outer periphery a magnetic cage serving as pulse-inducer for a spool accomodated in the housing in order to determine the revolutions/min. of the rotor.

JP-A 56128414 discloses a turbine-shaped flowmeter where the rotor, provided with blades, is magnetically accomodated in the housing. The blades themselves are accomodated crosswise on the housing of the rotor.

JP 57020611 also shows a flowmeter whose rotor has two crosswise arranged blades, whereas a magnet is accomodated in their crossing point to serve as a pulse-inducer.

DE-A 34 15 366 discloses a water meter whose turbine wheel is radially flowed against. The bedding of the turbine wheel is assured by radial bearings on an axle, whereas the radial bearings are connected to a centrifugal chamber of the impeller wheel via a channel so that dirt particles are scavenged from the bearings by the water flow. This water meter is quite big in size because of the radial flow against it. In order to increase the pulse ratio of the counter and with it the exactitude of said counter, a transmitter is provided, increasing the size even more.

Another disadvantage of this counter is that it has to be installed horizontally in flow direction, since otherwise the wear in the area of the bearings is too high. It is also possible that, due to the guiding of the sluice, dirt particles in the water are flushed into the bearings, causing them to deteriorate faster. A reduction of wear is thus out of the question.

WO 92/21939 discloses a device of the type mentioned above. Here, two radially running borings for the impeller wheel are provided at the end of the axle in the carrier body, said borings being arranged opposite to one another in the carrier body. The function of the borings is to permit fluid to reach the area between axle and carrier body where it has to care for lubrication, cooling and scavenging. It is not conceivable that the fluid is entering both borings and is exiting at the opening of the axle boring in the carrier body. This cannot be since the flow resistance in the area between axle and carrier body is higher than the resistance provided by one of the afore-mentioned borings. It has therefore to be assumed that the fluid is entering the one radial boring and is exiting through the other radial boring. Even if appreciable quantities of fluid are reaching the area between the axle and the boring in the carrier body, the risk that dirt particles carried along by the water are reaching this area, causing thus a faster deterioration, is still given, since, in the end, the flow medium, for example water, will also carry considerable quantities of dirt particles.

Depending on the volume of flow, the impeller wheel proved to be able to reach up to 30,000 revolutions/min. Moreover, so many revolutions/min. are considerably warming up the location of the impeller wheel, due to the friction between the axle and the impeller wheel or the carrier body. This friction considerably wears the bearing of the impeller wheel.

SUMMARY OF THE INVENTION

The object of the present invention is therefore to develop a device of the type mentioned above so that its durability is long enough, even in case of many revolutions/min and of a medium carrying dirt particles.

The solution of the present invention is to arrange the axle by at least one, preferably two radial bearings in the carrier body, whereas a radial allowance is provided between the boring in the carrier body and the axle, whereas, due to the radial allowance between boring in the carrier body and axle, water is entering at the open side of the boring and is exiting through the radially running opening in the carrier body.

When the carrier body is rotating, a slight depression is occurring behind the blade in flow direction. Due to this depression, fluid is sucked into the centrical boring of the carrier body because of the radial allowance of the radial bearings and is pressed out through the radially running opening in the front part of the carrier body. Dirt particles carried in the fluid and brought along with the flow have proved to be scavenged immediately out of the chamber without reaching the centrical boring. This clearly shows that there is a permanent exchange of fluid taking place in the centrical boring of the carrier body, with the consequence that a continuous cooling is possible and that there is always enough fluid available for the lubrication of the bearing or the axle respectively. A device having such a design proved to be durable enough, even with revolutions of up to 30,000 per minute.

To accomodate the axle, an axle-bearing is more particularly provided in the preferably cylindrical carrier body.

According to another characteristic of the invention, the blades are extending over a considerable part of the cylindrical carrier body's length. Such a long mounting of the blades entails a high efficiency due essentially to the fact that the pressure losses can be kept low. It is to this same purpose that the blades have been mounted at an angle of incidence of approximately 45°.

According to another, particular characteristic of the invention, the blade has been designed as a bow, whereas two blades having the shape of a bow, more particularly of an elliptical bow, are accomodated diagonally or crosswise on the periphery of the cylindrical carrier body. The elliptical shape of the blade is the result of the diagonal extension of the blades over the periphery of the carrier body. A blade having the shape of a bow or of an undulation offers a relative big surface of blade, whereas the diameter of the impeller wheel as a whole can be kept small. As already explained above, such a big surface of blade allows to increase the efficiency of the device as a whole. Thanks to the crosswise arrangement of the blades on the periphery of the carrier body, the occurring radial forces are essentially counterbalancing each other, the advantage of this measure being that the load on the radial bearings is small.

According to a particular characteristic of the invention the crossing point of the blades is located, seen in flow direction, spaced from the axial bearing on the carrier body. Hereby, the carrier body advantageously extends in axial direction over the length of the blades accomodated on the carrier body. The big spacing between the crossing point of the blades on the blade edge and the axial bearing particularly allows the impeller wheel to center itself like an arrow, so that the load on the radial bearings bearing the axle relative to the carrier body is small, which increases considerably the durability of the device. The nearly automatic centering of the impeller wheel can be explained by the fact that, due to the arrangement of the blades on the carrier body, the carrier body, just as would an arrow, always strives to align itself centrically in the chamber of the housing. The axle being thus also located centrically in the chamber, the area of the radial bearings is, as already explained above, subjected to only little wear and tear.

In order to determine the revolutions/min. of the impeller wheel, the carrier body is provided with a pulse inducer, e.g. a magnet, arranged, seen in direction of the flow, in front of the axial bearing, whereas the pulse inducer cooperates with a pulse receiver, e.g. a spool, arranged in the housing.

A particular advantageous embodiment of the device is characterized in that, seen in direction of the flow, a front perforated disk is accomodated in front of the carrier body to equalize or align the turbulent flow in the housing or in the chamber respectively. By thus accomodating such a perforated disk, the flow reaching the impeller wheel after having passed the perforated disk is still turbulent, but it is directed so as to induce the rotation of the impeller wheel immediately upon meeting with the blades of the impeller wheel. Usually, according to prior art, this can only be achieved by providing in the housing a long pre-travel during which the flow can get equalized. Thanks to a thus equalized but still turbulent flow, accurate measurements are made possible over a big measuring range, i.e. with varying flow rates.

Seen in direction of the flow, a second perforated disk, designed according to the first one in front, is located behind the impeller wheel, and is also receiving the axle for the carrier body of the impeller wheel. According to prior art, a certain slowing-down path is also provided behind the impeller wheel to avoid disturbances occurring in the course of the subsequent flow, for example due to turbulences. This is necessary, since such turbulences, even if they occur behind the impeller wheel, still can influence the number of revolutions/min. and thus the response characteristic of the impeller wheel depending on the subsequent course of the line.

The invention is explained in more details according to the drawing.

DESCRIPTION OF THE PREFERRED EMBODIMENT(S)

Figure 1:
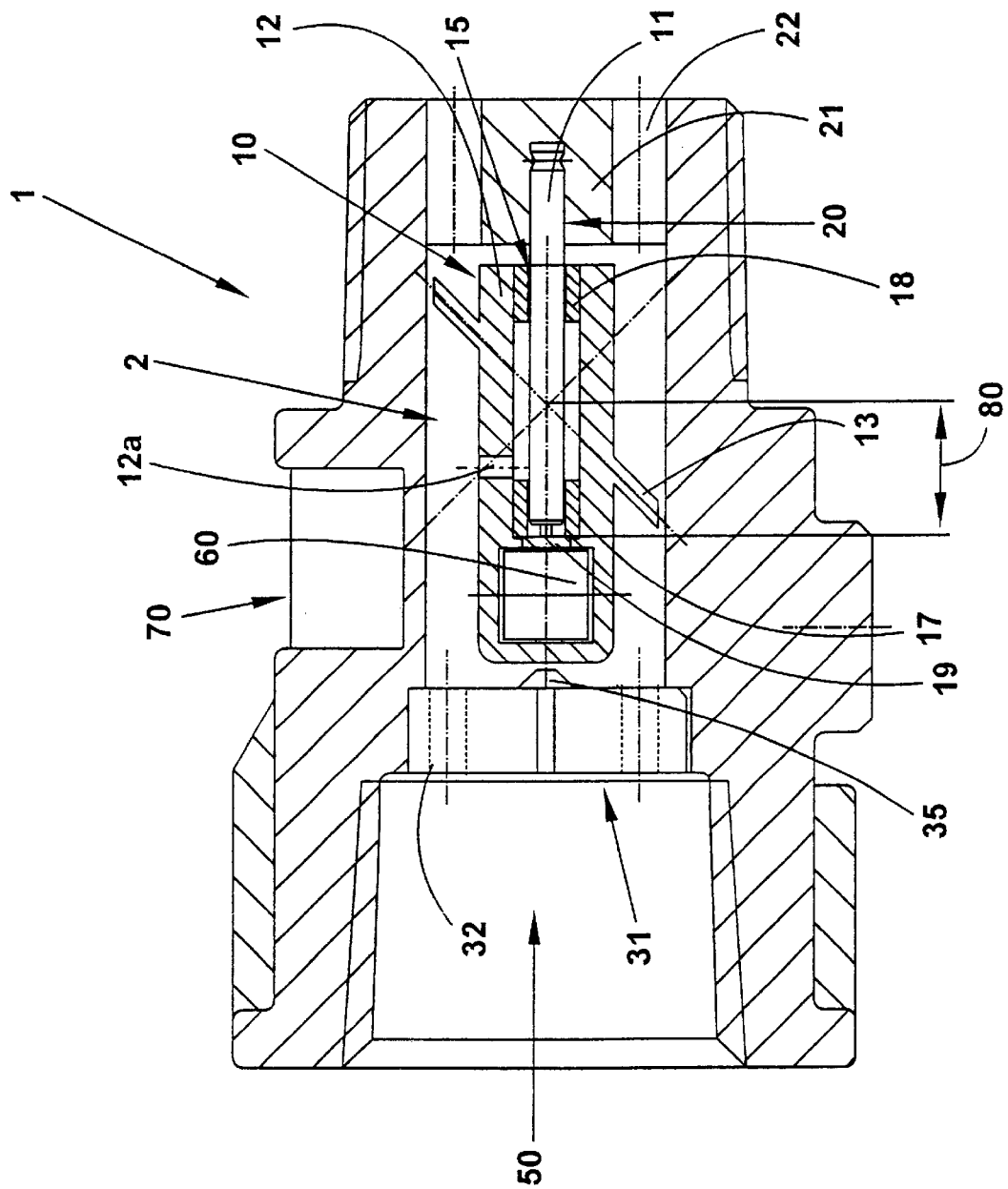
FIG. 1 is a sectional side view of the device.
Figure 2:
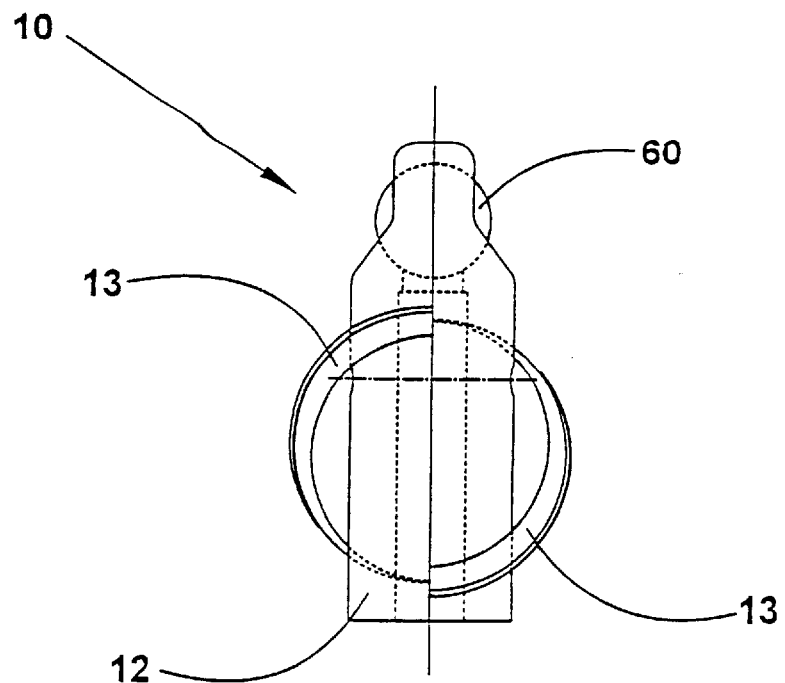
FIG. 2 is a perspective view of the impeller wheel.
Figure 3:
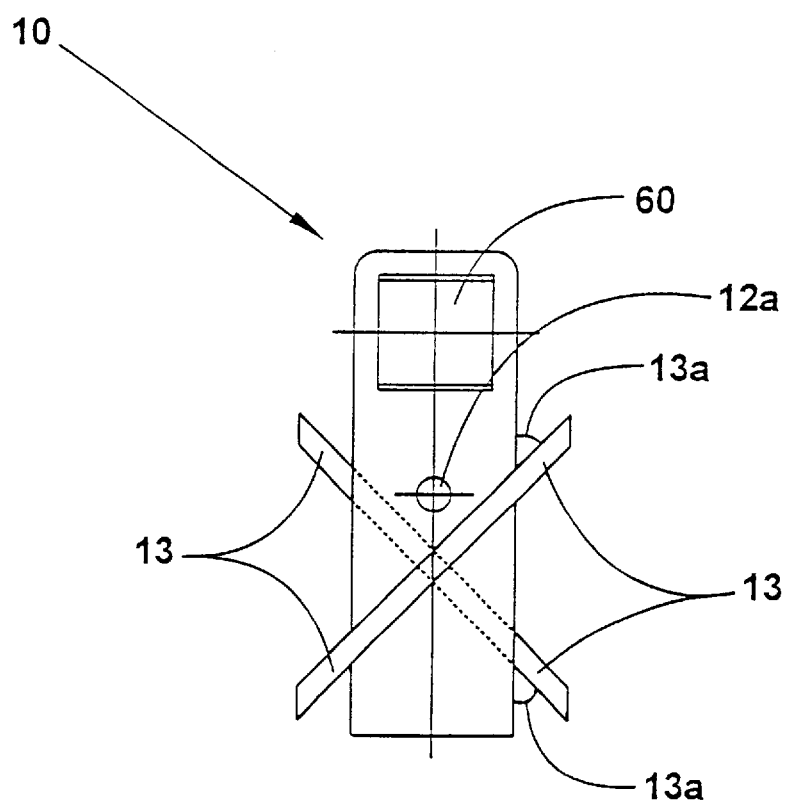
FIG. 3 shows the impeller wheel of FIG. 2 rotated by 90°.

According to FIG. 1, the housing of the device is referred to with numeral 1; a chamber 2 located in the housing 1 receives the impeller wheel referred to as a whole with numeral 10, whereas the carrier body 12 of the impeller wheel 10 receives in the boring 15 the axle 11, which is maintained in the rear perforated disk 21 by the boring 20. The perforated disk 21 is provided with eight borings 22 distributed over its circumference. The carrier body 12 of the impeller wheel extends over the major part of the length of chamber 2. Seen in direction of the flow according to arrow 50, bow-shaped blades 13 are accomodated on the carrier body 12 (see FIG. 2 and FIG. 3). That means that the bow-shaped blades are extending diagonally or crosswise over the periphery of the carrier body. The angle of incidence 13a of the blades 13 is of approximately 45°.

The carrier body 12 is carried by the axle 11 by means of two radial bearings 17, 18 as well as of an axle-bearing 19. As already mentioned, the axle is receivable with radial allowance by the bearings 17 and 18. Thus, the medium in the chamber 2, for example water, can penetrate into the boring 15 of carrier body 12 and flow outside through the opening 12a radially accomodated in the carrier body. A certain rinsing action thus takes place, i.e. a continuous cooling and lubrication of the axle-bearings 17–19 is taking place, since the opening is accomodated between the bearings 18 and 17 and 19 in the carrier body. The rinsing scavenges the dirt from the boring 15, further reducing the wear and tear of the bearings.

The magnet 60 is accomodated in front of the axle-bearing 19 against the direction of flow and cooperates with a pulse receiver, for example with a spool 70, arranged on the housing. The spool 70 is only schematically hinted at in the drawing of FIG. 1.

The blades 13 are accomodated on the carrier body 12 so that the crossing point of the blades on the carrier body is spaced from the axle-bearing 19 (arrow 80) and that the blades are extending over the carrier body 12. Thanks to this measure, the impeller wheel is centering itself just as would an arrow, The bigger the spacing between the axle-bearing 19 and the crossing point of the blades 13, the better the centering of the impeller wheel in the chamber. The magnet 60 is, as already explained, located in front of the axle-bearing 19, whereas the magnet too is arranged outside the area of the blades in the carrier body. By thus accomodating the magnet, no dirt can deposit in the area of the magnet, since the space between the magnet and the inner wall of chamber 2 is so big, that dirt is immediately swept away by the flow. If the magnet were accomodated in the area of the blades 13, there would indeed be a risk of dirt accumulation in the area of the magnet. Dirt deposit proved indeed to accumulate due to the little spacing between the blades 13 and the inner wall of chamber 2, whereas this dirt deposit can hinder the magnet to cooperate with the spool.

A further perforated disk 31 is accomodated in front of carrier body 12. The perforated disk 31 again is provided with eight borings 32 distributed over its circumference, whereas the turbulent flow reaching the disk is equalized by these borings. The size of the borings 32 is hereby such, that, and this is also true for the perforated disk 21, the free cross section described by the borings of these perforated disks is smaller than the cross section of the flow given between the inner wall of chamber 2 of housing 1 and the outer diameter of the carrier body 12.

The perforated disk 31 additionally shows in its center a gudgeon-like projection 35 which restricts the axial play of the carrier body 12 in chamber 2.

What is claimed is:

1. Device which is used to determine the flow rate of a fluid including a housing (1) with a chamber (2) through which the fluid flows in an axial direction (as indicated by arrow 50) and which receives an impeller wheel (10) with one blade (13), the impeller wheel (10) being provided with a carrier body (12) having a central boring (15) for receiving an axle (11), the carrier body (12) being provided with at least one radially extending opening (12a) extending between the axle in the central boring (15) and the chamber (2), characterized in that a perforated disc (21) is mounted in one end of the chamber (2) and the axle (11) viewing the chamber (2) in the direction of the flow of the fluid (arrow 50), is mounted in at least one bearing (17 or 18) in the carrier body (12), and a radial space allowance is provided between the boring (15) of the carrier body (12) and the axle (11) into which fluid enters through the at least one bearing (17 or 18) into the boring (15) on account of the radial space allowance between the boring (15) in the carrier body (12) and the axle (11) and exits through the at least one radially extending opening (12a) in the carrier body (12).

2. Device according to claim 1,
   characterized in that an axle-bearing (19) is provided in the carrier body (12) for receiving the axle (11).

3. Device according to claim 1,
   characterized in that the blade (13) is curved or arcuate and extends skew to an elongate axis of the axle.

4. Device according to claim 3,
   characterized in that the carrier body has an outer periphery and two curved or arcuate blades (13) are fixed to and extend about the periphery of the carrier body (12).

5. Device according to claim 4,
   characterized in that, viewing the chamber 2 in the direction of the flow (arrow 50) of the fluid, the crossing point of the blades (13) of impeller wheel (10) is spaced (arrow 80) from an axle-bearing (19) in the carrier body (12).

6. Device according to claim 3,
   characterized in that the blade (13) extends over a major part of the length of the carrier body (12).

7. Device according to claim 3,
   characterized in that the blade (13) is located at an angle of incidence with respect to an outer periphery of the carrier body of approximately 45°.

8. Device according to claim 2,
   characterized in that the carrier body (12) is provided, viewing the device in direction of flow (arrow 50), with at least one pulse giver (60) in front of the axle-bearing, the pulse giver cooperating with a pulse receiver (70) received on or in the housing (1) to determine the resolutions/min. of the impeller wheel (10).

9. Device according to claim 1,
   characterized in that the carrier body (12) extends axially over the blade (13) mounted on the carrier body (12).

10. Device according to claim 1,
    characterized in that, viewing the chamber (2) in the direction of the flow of the fluid, a front perforated disk (31) is positioned in front of the carrier body (12) to equalize or align the flow of fluid in the chamber (2).

11. Device according to claim 10,
    characterized in that the front perforated disk (31) is provided with a gudgeon-like projection (35) facing the carrier body (12) and restricting the axial play of the carrier body (12) on the axle (11).

12. Device according to claim 1,
    characterized in that, viewing the device in direction of the flow (arrow 50), a rear perforated disk is positioned behind the carrier body (12).

13. Device according to claim 12,
    characterized in that the axle (11) for carrier body (12) is centrically located in the rear perforated disk (21).

14. Device according to claim 1,
    characterized in that the carrier body (12) is generally cylindrical in shape.

* * * * *